(12) United States Patent
Chen et al.

(10) Patent No.: US 7,038,206 B2
(45) Date of Patent: May 2, 2006

(54) INFRARED SENSOR AND IMAGER WITH DIFFERENTIAL FERROELECTRIC CELLS

(75) Inventors: Zheng Chen, Colorado Springs, CO (US); Carlos A. Paz de Araujo, Colorado Springs, CO (US); Jolanta Celinska, Colorado Springs, CO (US); Larry D. McMillan, Colorado Springs, CO (US)

(73) Assignees: Symetrix Corporation, Colorado Springs, CO (US); Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/960,876

(22) Filed: Oct. 6, 2004

(65) Prior Publication Data

US 2005/0072925 A1    Apr. 7, 2005

Related U.S. Application Data

(60) Provisional application No. 60/509,191, filed on Oct. 6, 2003.

(51) Int. Cl.
*G01J 5/02* (2006.01)

(52) U.S. Cl. .................................. 250/338.2

(58) Field of Classification Search ............... 250/338.2
See application file for complete search history.

(56) References Cited

U.S. PATENT DOCUMENTS

| | | | | |
|---|---|---|---|---|
| 4,080,532 A | * | 3/1978 | Hopper ........................ | 250/332 |
| 4,952,808 A | * | 8/1990 | Turnbull et al. ......... | 250/338.3 |
| 5,574,375 A | * | 11/1996 | Nagai ......................... | 324/502 |
| 6,339,221 B1 | | 1/2002 | Schubring et al. | |
| 6,534,767 B1 | * | 3/2003 | Di Maio et al. .......... | 250/338.2 |

* cited by examiner

*Primary Examiner*—David Porta
*Assistant Examiner*—Marcus Taningco
(74) *Attorney, Agent, or Firm*—Patton Boggs LLP (57) ABSTRACT

A pyrometer cell comprises a first ferroelectric capacitor, a second ferroelectric capacitor, and a difference circuit for determining the difference between the polarization charge, voltage, or current between the first and second ferroelectric capacitors. The cell is pulsed a plurality of times and an integrator circuit connected to the difference circuit provides an enhanced output signal representative of the integrated difference. An infrared imager is formed by an array of the pyrometer cells, with one ferroelectric capacitor in each cell exposed to an infrared source and the other ferroelectric capacitor not exposed to the infrared source.

12 Claims, 5 Drawing Sheets

INFRARED SENSOR AND IMAGER WITH DIFFERENTIAL FERROELECTRIC CELLS

RELATED APPLICATIONS

This patent application claims the benefit of U.S. Provisional Patent Application No. 60/509,191 filed Oct. 6, 2003, which provisional patent application is hereby incorporated by reference to the same extent as though fully disclosed herein.

BACKGROUND OF THE INVENTION

1. Field of the Invention

The invention in general relates to pyroelectric sensors, and in particular such a sensor that utilizes a ferroelectric sensing element.

2. Statement of the Problem

Figure 1:
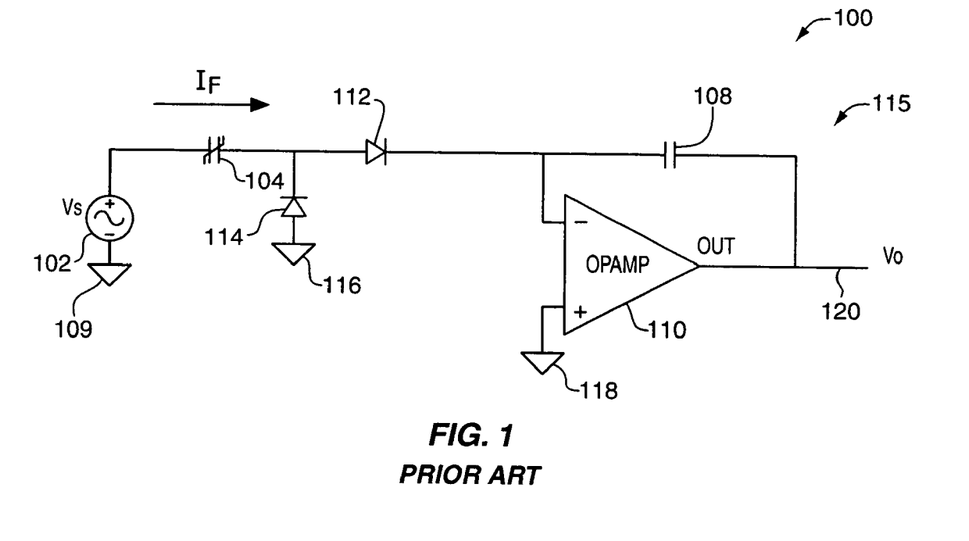
FIG. 1 is a circuit diagram of the prior art pyroelectric sensor.

Pyroelectric sensors that utilize ferroelectric sensing elements are known in the art, such as described in U.S. Pat. No. 6,339,221, which is hereby incorporated by reference as though fully disclosed herein. An electrical schematic of an active pyroelectric sensor 100 as disclosed in U.S. Pat. No. 6,339,221 is shown in FIG. 1. Sensor circuit 100 includes a source 102 of a voltage pulse $V_s$, a ferroelectric capacitor 104, a linear storage capacitor 108, an operational amplifier 110, and diodes 112 and 114. Electric pulse source 102 is connected between ground 109 and one electrode of ferroelectric capacitor 104. The other electrode of ferroelectric capacitor 104 is connected to the cathode of diode 114 and the anode of diode 112. The anode of diode 114 is connected to ground 116 and the cathode of diode 112 is connected to the inverting input of operational amplifier 110 and one electrode of capacitor 108. The other electrode of capacitor 108 is connected to the output 120 of op amp 110. The non-inverting input of op amp 110 is connected to ground 118. Connected in this form, capacitor 108 and operational amplifier 110 form an integrator 115. Sensor 100 operates as follows. An AC signal Vs is applied to the ferroelectric capacitor 112 to switch the polarization which causes a polarization current, $I_p$, to flow to integrator 115 which integrates the pulses of ferroelectric switching current. Diodes 112 and 114 filter the switching current, allowing only the positive part of the pulse to flow to integrator 115, while the negative portion flows to ground 116. The ferroelectric polarization of capacitor 104 changes with temperature, which is known as the pyroelectric effect. The output voltage, $V_O$, of operational amplifier 110 will depend on the polarization of capacitor 112, and thus on the temperature. The change in polarization of capacitor 104 with temperature is small; however, the integration of many pulses by integrator 115 permits the temperature change to be sensed as indicated by a change in the output voltage $V_O$.

Analyzing the design of sensor 115, if $C_0$, the capacitance of capacitor 108 is equal to $C_f$, the capacitance of ferroelectric capacitor 104, $V_O$, will reach its maximum after 1 cycle. Therefore, if multiple pulse cycles are to be integrated, $C_0$ must be greater than $nC_f$, where n is the number of pulse cycles integrated, otherwise $V_O$ will saturate. Assuming $C_0 = nC_f$, $V_O$ will gradually increase with the number of applied cycles, and reach its maximum. The maximum of $V_O$ is:

$$nPr/C_0 = Pr/C_f, \quad (1)$$

where Pr is the remnant polarization of the ferroelectric capacitor 112. If there is a temperature change, the maxim change of $V_O$ is:

$$\Delta V_0 = \Delta Pr/C_f = A_f p_y \Delta T/C_f, \quad (2)$$

where $A_f$ is the area of the ferroelectric capacitor and $p_y$ is the pyroelectric coefficient. Since the change of $V_O$ does not depend on n, an increase of n will not increase the maximum of $V_O$, or the maximum change of $V_O$. Thus, the ability of sensor 100 to sense changes of temperature depend on the area and capacitance of the ferroelectric capacitor, which creates constraints on the design of the circuit, which limits the ability of the circuit 100 to sense small changes of temperature.

It would, therefore, be highly desirable to have a ferroelectric pyroelectric sensor in which simply by increasing the number of integration cycles the sensitivity of the sensor could be increased.

SUMMARY OF THE INVENTION

The invention provides a solution to the above problem by providing a pyroelectric sensor which utilizes a pair of ferroelectric capacitors. Preferably, one of the ferroelectric capacitors is exposed to infrared radiation to be sensed while the other of the ferroelectric capacitors is not exposed to the source of radiation, and thus serves as a reference capacitor. Preferably, a difference circuit determines the difference in polarizability of the ferroelectric polarization of the two ferroelectric capacitors. Preferably, the polarizability difference is determined a plurality of times, and the plurality of differences are integrated by an integrator. An infrared imager is formed by utilizing an array of the sensor cells.

The invention provides a pyrometer cell comprising: a first ferroelectric capacitor and a second ferroelectric capacitor; a difference circuit for determining the difference between the polarization charge, voltage or current between the first and second ferroelectric capacitors; and an integrator circuit connected to the difference circuit and providing an output signal representative of the difference.

In another aspect, the invention provides an infrared sensor for sensing a source of infrared radiation, the infrared sensor comprising: a first ferroelectric element exposed to the source of infrared radiation; a second ferroelectric element not exposed to the source of infrared radiation; and a polarization measurement circuit connected to the first and second ferroelectric elements and providing an output signal indicative of the difference in ferroelectric polarizability of the first and second ferroelectric elements. Preferably, the polarization measurement circuit comprises a subtractor and an integrator. Preferably, the integrator integrates a voltage, a charge, or a current. Preferably, the difference polarization is a polarization charge, a polarization voltage, or a polarization current.

The invention also provides an infrared imager comprising: an array of infrared sensor cells, each infrared sensor cell comprising: a first ferroelectric element exposed to the source of infrared radiation; and a second ferroelectric element not exposed to the source of infrared radiation; and an output circuit for providing an output signal indicative of the difference in polarization of the first ferroelectric element and the ferroelectric element for each of the infrared sensor cells. Preferably, the output circuit comprises a first circuit portion in each of the sensor cells and a second circuit portion external to the cells. Preferably, the first circuit portion comprises a subtractor and the second circuit portion comprises an integrator. Preferably, there is one of the integrators for each column or row of the array.

The invention also provides a method of sensing the intensity level of an infrared source, the method comprising: exposing a first ferroelectric element to the infrared source; determining a first polarization charge of the ferroelectric element exposed to the infrared source; determining a second polarization charge of a second ferroelectric element not exposed to the infrared source; finding the difference between the first polarization charge and the second polarization charge; and utilizing the difference to determine the intensity level of the infrared source. Preferably, the processes of determining a first polarization charge, determining a second polarization charge, and finding the difference are repeated a plurality of times to determine a plurality of the differences, and further including integrating the plurality of differences. Preferably, there are a plurality of the first and second ferroelectric elements, and the utilizing comprises forming an image of the infrared source. Preferably, the ferroelectric elements are ferroelectric capacitors.

The invention also provides a low-noise method of sensing the intensity level of an infrared source, the method comprising: providing a sensing circuit having a first ferroelectric element and a second ferroelectric element that are essentially equivalent with respect to noise; determining a difference between the polarization charge, voltage, or current between the first and second ferroelectric elements, which difference essentially cancels non-random noise in the sensing circuit; and utilizing the difference to determine the intensity level of the infrared source. Preferably, the determining comprises sensing the difference in polarization charge between the first and second ferroelectric element. Preferably, the determining comprises exposing the first ferroelectric element to the infrared source while not so exposing the second ferroelectric element. Preferably, the ferroelectric elements are ferroelectric capacitors. Preferably, the sensing circuit comprises an integrator and the utilizing comprises integrating the difference over a plurality of sensing cycles. Preferably, the determining further comprises reducing the random noise in the sensing circuit by determining the difference over a plurality of measurement cycles. Preferably, there are 150 or more of the measurement cycles. More preferably, there are 200 or more of the measurement cycles. Most preferably, there are 250 or more of the measurement cycles.

Numerous other features, objects and advantages of the invention will become apparent from the following description when read in conjunction with the accompanying drawings.

DETAILED DESCRIPTION OF THE PREFERRED EMBODIMENT

1. Overview

Figure 2:
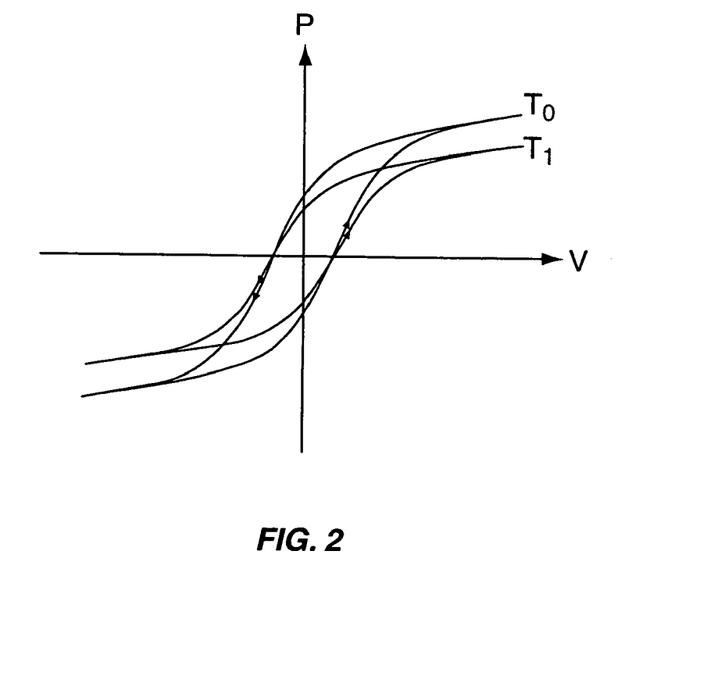
FIG. 2 illustrates the change in the polarization hysteresis curve of a ferroelectric capacitor in response to a change in temperature.

Turning to FIG. 2, an example of the response of a ferroelectric hysteresis loop to a change in temperature is shown. As known in the ferroelectric art, a ferroelectric hysteresis curve is created by plotting ferroelectric polarizability, P, versus the voltage applied to the ferroelectric material. Two hysteresis curves are shown, one plotted for the ferroelectric material at a temperature $T_0$ and a second plotted for the same ferroelectric material at a temperature $T_1$, where T1>T0. As shown in the figure, ferroelectric polarization typically decreases as temperature increases. This change is called the ferroelectric pyroelectric effect. In general, the fact that the spontaneous polarization P of a ferroelectric is a function of temperature T is written as:

$$P=P(T), \qquad (3)$$

and the pyroelectric coefficient py is given by:

$$p_y=dP(T)/dT \qquad (4)$$

The pyroelectric sensors according to the invention sense the change in ferroelectric polarization caused by a temperature change. These pyroelectric sensors have many applications. As known in the art, when combined with suitable optics, an array of such sensors can form an infrared imaging system.

Figure 3:
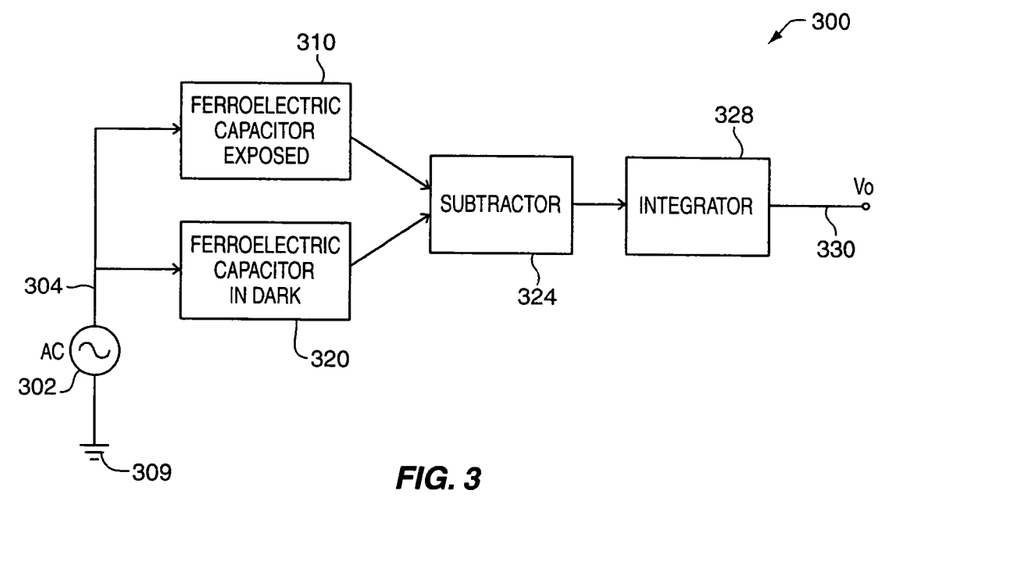
FIG. 3 is a block circuit diagram of the preferred embodiment of a pyroelectric sensor according to the invention.

FIG. 3 is a block circuit diagram of the preferred embodiment of a pyroelectric sensor 300 according to the invention. Sensor 300 includes a source 302 of a voltage pulse, a first ferroelectric capacitor 310, a second ferroelectric capacitor 320, a difference circuit 324, which in the preferred embodiment is a subtractor 324, an integrator circuit 328, and an output 330. One input to voltage pulse source 302 is connected to a reference voltage, shown as a ground 309. The output of 304 of voltage pulse source 302 is connected to one electrode of each of the capacitors 310 and 320. The other electrode of each of the capacitors 310 and 320 is connected to an input of subtractor 324, and the output of subtractor 324 is connected to integrator 328. The output 330 of integrator 328 is the sensor output. Preferably, the sensor output signal, $V_O$, is a voltage representative of the difference in polarizability, and thus temperature, between first ferroelectric capacitor 310 and second ferroelectric capacitor 320. In the preferred embodiment of sensor 300, capacitor 310 is exposed to the environment to be sensed, and capacitor 320 is shielded from the environment, which in the application of an imager, means it is in the dark.

Figure 4:
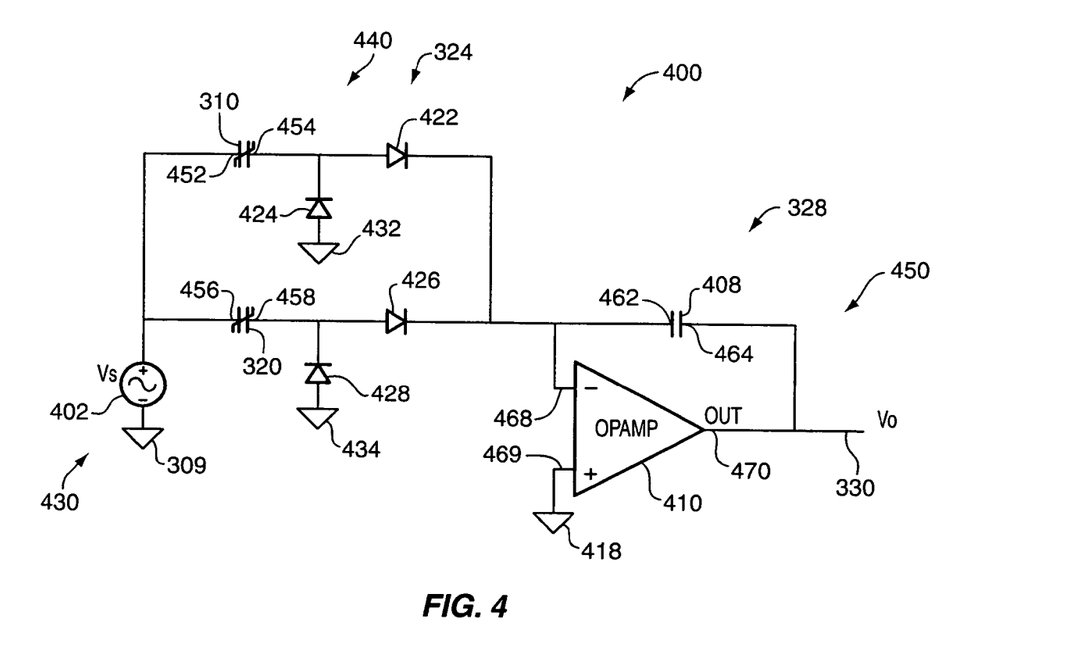
FIG. 4 is an electrical circuit diagram of a preferred pyroelectric sensor according to the invention.

Turning now to FIG. 4, an electrical circuit diagram of a preferred pyroelectric sensor 400 according to the invention is shown. Parts of sensor 400 that are identical to generalized sensor 300 are labeled with the same numeral. Sensor 400 preferably includes a source 302 of a voltage pulse, $V_s$, a first ferroelectric capacitor 310, a second ferroelectric capacitor 320, a subtractor 324, an integrator 328, and an output 330. Subtractor 324 comprises diodes 422 and 424, 426 and 428, and ground connections 432 and 434. Integrator 328 includes capacitor 408, operational amplifier 410, and ground connection 418. The voltage pulse source 402 is connected between the system ground 309 and first electrodes 452 and 456 of capacitors 310 and 320, respectively. Second electrode 454 of capacitor 310 is connected to the anode of diode 424 and the cathode of diode 422. The cathode of diode 424 is connected to ground 432, and the anode of diode 422 is connected to the inverting input 468 of operational amplifier 410 and first electrode 462 of capacitor 408. Second electrode 458 of capacitor 320 is connected to the cathode of diode 428 and the anode of diode 426. The anode of diode 428 is connected to ground 434 and the cathode of diode 426 is connected to the inverting input 468 of operational amplifier 410 and first electrode 462 of capacitor 408. The non-inverting input of operational amplifier 410 is connected to ground 418. The second electrode 464 of capacitor 408 is connected to the output 470 of operational amplifier 410 and to the sensor output 330.

As will be seen in more detail below, the circuit including capacitors 310 and 320, diodes 422, 424, 426, and 428, and ground connections 432 and 434 can be considered as an elemental sensor cell 440. In this context, voltage pulse source 402 and ground connection 309 can be considered as a sensor read pulse source 430, and integrator circuit 328 can be considered as a sensor sense amplifier circuit 450.

Sensor 400 operates as follows. A voltage $V_s$ is applied to capacitors 310 and 320 by pulse source 430. This pulse, for example, may oscillate from −5V to 5V. On the positive pulse, that is, when $V_s$ goes from 0V to 5V and back to 0V, ferroelectric switching current from capacitor 310 is pumped into capacitor 408. On the negative pulse, that is, when $V_s$ goes from 0V to −5V and back to 0V, charge is drawn from capacitor 408 by the ferroelectric switching current flowing back to capacitor 320. Thus, the charge associated with ferroelectric capacitor 320 is subtracted from the charge associated with capacitor 310 by subtractor 324.

With a temperature difference ΔT between capacitor 310 and capacitor 320, the charge difference integrated on capacitor 408 is:

$$\Delta Q = 2 A_f p_y \Delta T \quad (5)$$

where $A_f$ is the area of the ferroelectric capacitors 310 and 320. After applying n cycles of excitation, the total charge on capacitor 408 is:

$$Q_0 = n\Delta Q \quad (6)$$

and the voltage shown across capacitor 408 is:

$$V_0 = Q_0/C_0 = n 2 A_f p_y \Delta T / C_0 \quad (7)$$

Note that in the above equation, $C_0$ is not bounded by the ferroelectric capacitance as in the prior art. In fact, $C_0$ can be any value, but no less than the ferroelectric capacitance of capacitor 310 or capacitor 320. From equation 7, the output voltage $V_0$ is a linear function of applied excitation cycles, n.

It should be understood that the sensors 300 and 400 are only intended to illustrate the inventive sensor sufficiently so that it can be understood by those skilled in the art. Those skilled in the art will understand that, though the sensors 300 and 400 have been described in terms of a voltage pulse $V_s$ and a voltage output $V_0$, they could also have been described in terms of currents, charges, or a mix of voltages, currents, and charges, since when voltage is applied, current and charge will also flow.

2. Example of the Design of a Practical Pyroelectric Infrared Sensor

Assume a sensor with sensitivity, in terms of noise equivalent temperature difference, of 50 mK is required. This sensitivity means that a temperature change of 50 mK can be sensed in the radiant infrared energy, and is a reasonable goal for an imaging device. Assuming that 1/100 of the temperature difference is absorbed by the exposed ferroelectric capacitor, the actual sensitivity on chip is 50 mK/100=0.5 mK. Assuming the total temperature change of the radiant energy is 200K and the exposed ferroelectric capacitor can only see 2 T temperature change, the total number of levels of the A/D converter should be 2K/0.5 mK=4000. Assuming the A/D converter swings from 0V to 2V, the resolution of A/D converter should be 2V/4000=500 μV. Then to obtain a sensitivity corresponding to the required 0.5 mK temperature difference, the minimum voltage built up on capacitor 408 should be 500 μV.

For a typical ferroelectric material, such as strontium bismuth tantalite (SBT), the pyroelectric coefficient py=0.03 μC/cm$^2$K (microcoulombs per centimeter squared Kelvin). The charge difference corresponding to 0.5 mK is $\Delta Q = 2 * A_f * p_y * \Delta T$. Assume Af is 100 μm$^2$, then $\Delta Q = 3 \times 10^{-17}$C, or about 200 electrons. If the integration capacitor 408 is 15 pF, then $V_0 = \Delta Q/C_0 = 2$ μV after one full cycle of excitation. Therefore, we need n=250 for $V_0$ to reach 500 μV. In other words, corresponding to 2K temperature difference, n must be 250 for $V_0$ reaching 2 volts.

Figure 5:
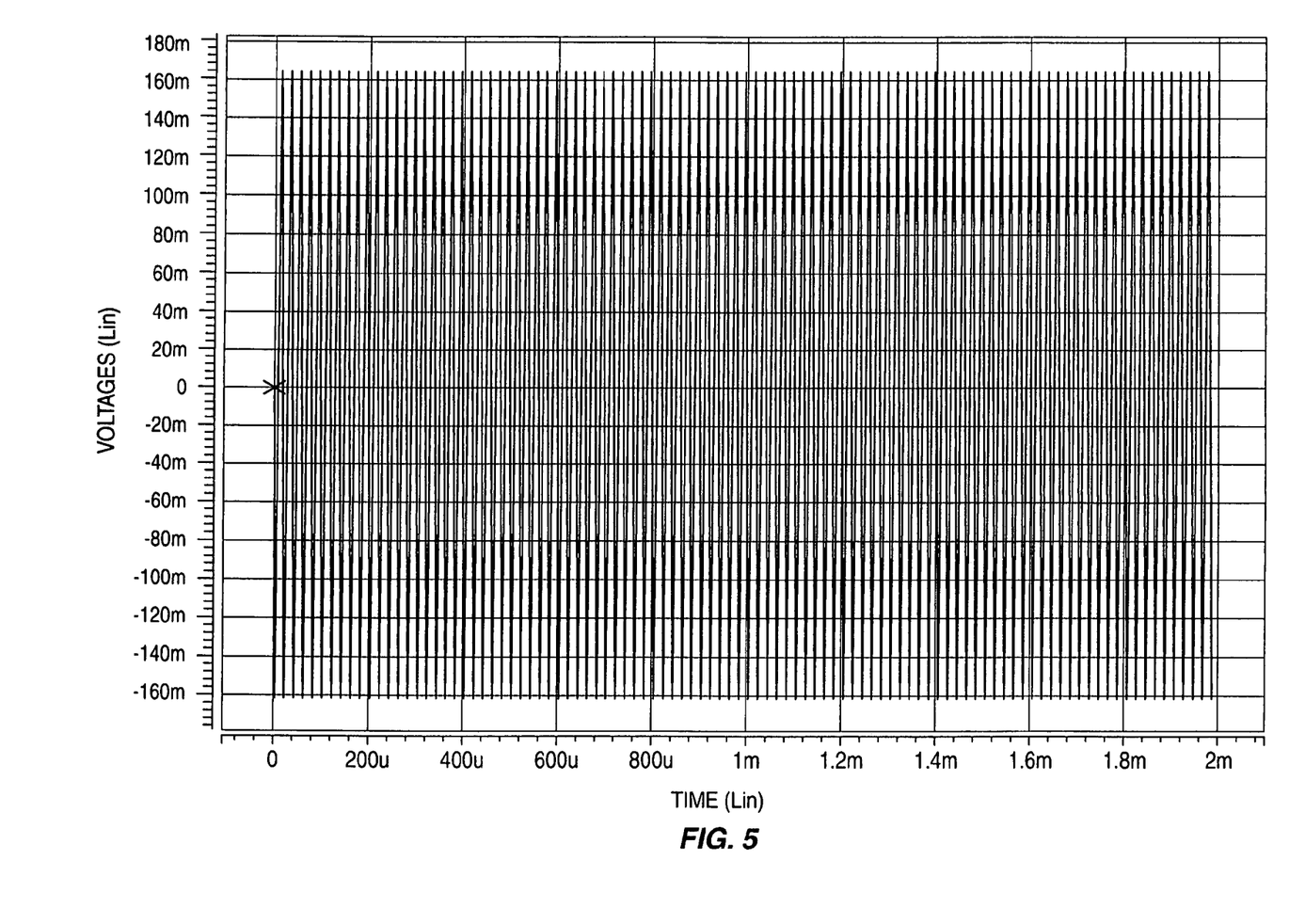
FIG. 5 is a graph of output voltage $V_O$ versus the number of integration cycles n when both the ferroelectric capacitors of FIG. 4 are at the same temperature.
Figure 6:
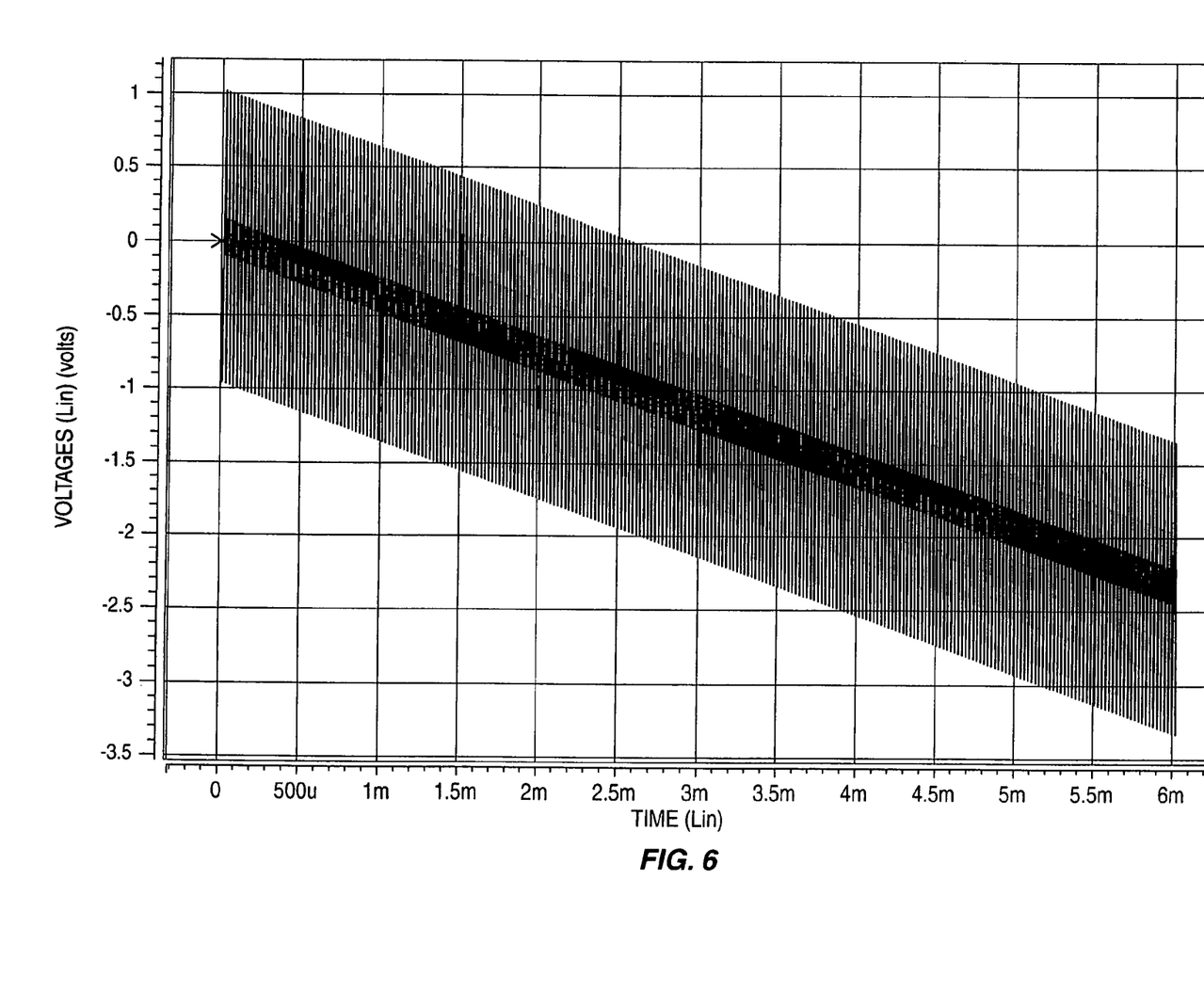
FIG. 6 is a graph of output voltage $V_O$ versus the number of integration cycles n when there is a temperature difference of 2K between the ferroelectric capacitors of FIG. 4.

FIG. 5 is a graph of output voltage $V_0$ in millivolts (m) along the ordinate versus time in microseconds (μ) and milliseconds (m) along the abscissa for a simulated sensor 400 with the above characteristics when both the ferroelectric capacitors 310 and 320 of sensor 400 are at the same temperature. Each oscillation of the graph shows one cycle. The output voltage $V_0$ oscillates between approximately 160 millivolts and negative 160 millivolts with no measurable voltage change occurring. FIG. 6 is a graph of output voltage $V_0$ in volts along the ordinate versus the time in microseconds (μ) and milliseconds (m) along the abscissa when there is a temperature difference of 2K between the ferroelectric capacitors 310 and 320. Again, each oscillation of the graph shows one cycle. FIG. 6 confirms that when temperature difference between capacitors 310 and 320 is 2K, the output voltage $V_0$ reaches 2V after 250 excitation cycles. If the same simulation is run on a prior art sensor, the output voltage saturates at a voltage well below 2 volts, which saturation would take place after only about a hundred cycles.

Figure 7:
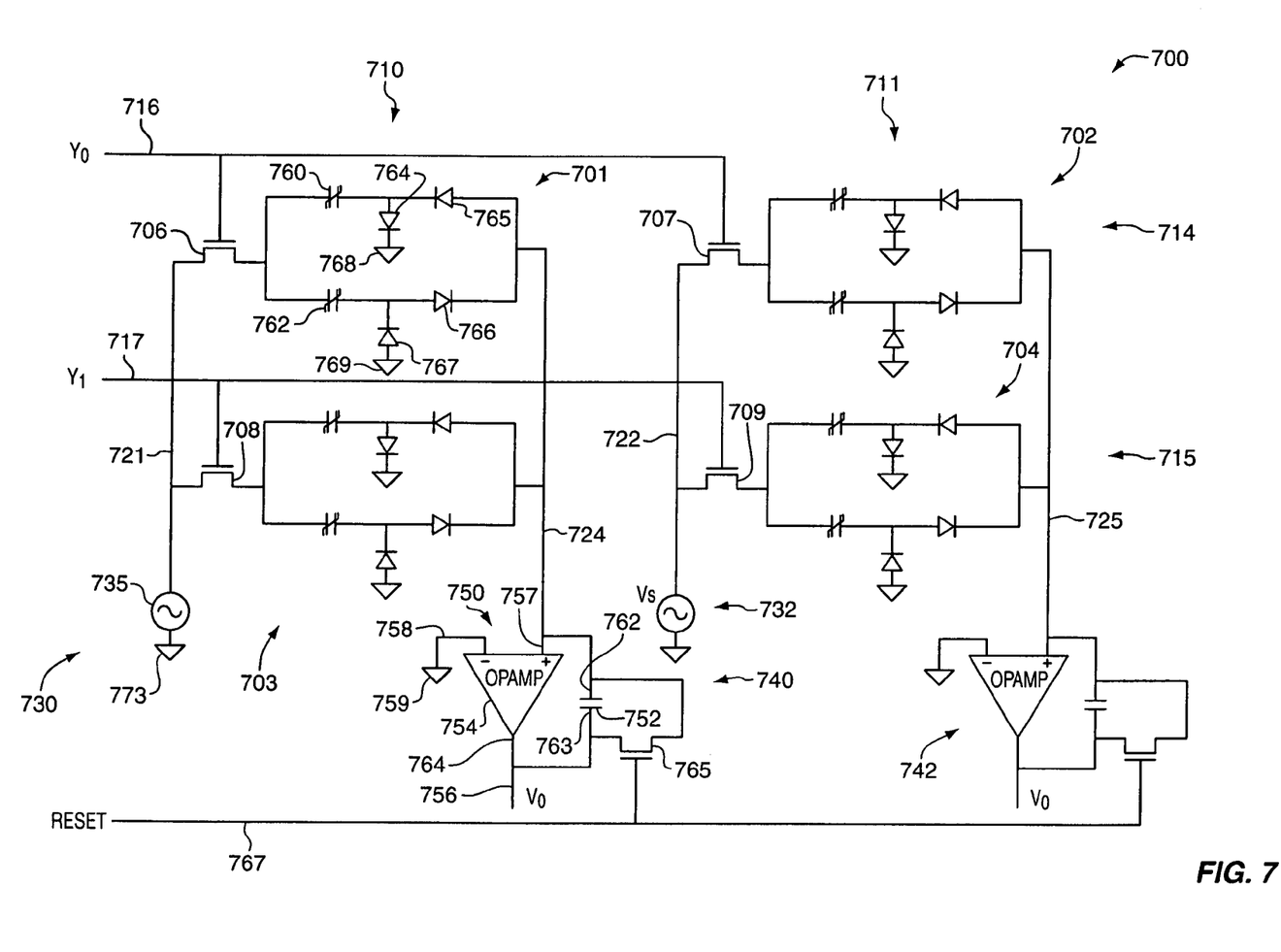
FIG. 7 is a circuit diagram of a 2×2 array of pyroelectric sensors according to the invention illustrating an image sensor according to the invention.

FIG. 7 shows an image sensor 700 with 2×2 array design. Image sensor 700 includes four sensor cells 701, 702, 703, and 704. Each cell 701 through 704 comprises a pair of ferroelectric capacitors, such as 760 and 762, four diodes 764, 765, 766, and 767, and a pair of ground connections 768 and 769, all connected identically as shown in the cell 440 of FIG. 4. In addition, each cell includes a transistor, such as 706. The cells are arranged in to two columns, 710 and 711, and two rows, 714 and 715. Each row, 714 and 715, is address via a word line 716 and 717, respectively. Each column, 710 and 711, is pulsed via a read line 721 and 722, respectively. Each column, 710 and 711, is read via a bit line 724 and 725, respectively. Each read line, 721 and 722, is connected to a read pulse source 730 and 732, respectively. Each read pulse source, such as 730, preferably includes a voltage source 735 connected to a ground 736. Each bit line 724 and 725 is connected to an integrator 740 and 742, respectively. Each integrator, such as 740, comprises a capacitor 752, an operational amplifier 754, and a reset transistor 765, with the non-inverting or reference input 758 of the operational amplifier 754 connected to a ground 759, and the inverting input 757 of the op amp 754 connected to the bit line, such as 724. The bit line also connects to the first electrode 762 of capacitor 752, while the second electrode 763 of capacitor 752 is connected to the output 764 of op amp 744 and to output 756. The gates of the reset transistors, such as 765, are connected to a source 767 of a reset signal.

The gates of access transistors 706 and 707 in row 714 are connected to word line 716, while the gates of access transistors 708 and 709 of row 715 are connected to word line 717.

Image sensor 700 operates as follows. First, the reset signal goes high to short the integrating transistors, such as 765, and clear them. The reset signal goes low, and then the word line signal, such as $Y_0$, of the selected row, such as 714, goes high to turn on the access transistors of that row. Each read line, such as 721, is pulsed by its pulse source, such as 730, a sufficient number of times to produce readable output on the corresponding output, such as 756. The word line signal, such as $Y_0$, then goes low, and the cycle is repeated for the next selected row. Only one row at a time is accessed, and each column shares an integrator.

Image sensor 700 is only intended to illustrate the structure and operation of an image sensor array. As known in the art, a practical array will include hundreds or even thousands of rows and columns. The array may not be a square array, but may also be rectangular, with more rows than columns, or more columns than rows.

A feature of the invention is that background noise in the circuit is canceled by the invention. In one aspect, this noise cancellation is due to the fact that two ferroelectric capacitors which are essentially equivalent with respect to noise are used, and the ferroelectric switching charge for one is subtracted from the ferroelectric switching charge for the other. The ferroelectric capacitors in each cell, such as 310 and 320, are made in the same semiconductor process at the same time, are of preferably the same size, and are located very close to one another on an integrated circuit chip. Thus, non-random sources of noise, such as noise due to the capacitance of lines 721 and 724, or the electronic lines in the individual cells, will be present in both the positive cycle pulse and the negative cycle pulse, and will be subtracted out so only the difference signal remains. This noise subtraction increases the sensitivity of the sensor as compared to prior art sensors. The integration over many cycles also reduces the noise. Random noise increases with increasing number of cycles as the square root of n, the number of cycles. However, as shown in FIG. 6, the output $V_O$ increases linearly. Thus, the signal to noise ratio will increase as the square root of n as the number of cycles increases. Since, for the sensor according to the invention, the output voltage $V_O$ can increase all the way to the system voltage, that is, in practice the voltage has a much wider range, the noise can be reduced much more significantly than in the prior art. These noise reduction effects can be useful in many IR sensing applications other than the embodiments described herein.

There has been described a novel infrared sensor and image sensor utilizing a pair of ferroelectric capacitors. Now that the sensor architecture has been described, those skilled in the art may make many variations. It should be understood that the particular embodiments shown in the drawings and described within this specification are for purposes of example and should not be construed to limit the invention, which will be described in the claims below. For example, if the array of FIG. 7 is turned ninety degrees, rows become columns and columns become rows. Further, word lines may be formed parallel to columns instead of rows, and bit lines may be formed parallel to rows instead of columns. Folded architectures known in the art may be employed. It is also evident that those skilled in the art may now make numerous uses and modifications of the specific embodiments described, without departing from the inventive concepts. It is further evident that the methods recited may, in many instances, be performed in a different order, or equivalent components may be used in the sensors, and/or equivalent processes may be substituted for the various processes described. Consequently, the invention is to be construed as embracing each and every novel feature and novel combination of features present in and/or possessed by the invention herein described.

What is claimed is:

1. An infrared imager comprising:
    an array of infrared sensor cells, each said infrared sensor cell comprising: a first ferroelectric element exposed to said source of infrared radiation; and a second ferroelectric element not exposed to said source of infrared radiation; and
    an output circuit for providing an output signal indicative of the difference in polarization of said first ferroelectric element and said second ferroelectric element for each of said infrared sensor cells.

2. An infrared imager as in claim 1 wherein said output circuit comprises a first circuit portion in each of said sensor cells and a second circuit portion external to said cells.

3. An infrared imager as in claim 2 wherein said first circuit portion comprises a subtractor and said second circuit portion comprises an integrator.

4. An infrared imager as in claim 3 wherein there is one of said integrators for each column or row of said array.

5. A method of sensing the intensity level of an infrared source, said method comprising:
    exposing a first ferroelectric element to said infrared source;
    determining a first polarization charge of said ferroelectric element exposed to said infrared source;
    determining a second polarization charge of a second ferroelectric element not exposed to said infrared source;
    finding the difference between said first polarization charge and said second polarization charge; and
    utilizing said difference to determine said intensity level of said infrared source;
    wherein said processes determining a first polarization charge, determining a second polarization charge, and finding the difference are repeated a plurality of times to determine a plurality of said differences, and further including integrating said plurality of differences.

6. A low-noise method of sensing the intensity level of an infrared source, said method comprising:
    providing a sensing circuit having a first ferroelectric element and a second ferroelectric element that are essentially equivalent with respect to noise;
    determining a difference between the polarization charge, voltage, or current between said first and second ferroelectric elements, which difference essentially cancels non-random noise in said sensing circuit; and
    utilizing said difference to determine said intensity level of said infrared source.

7. A method as in claim 6 wherein said determining comprises sensing the difference in polarization charge between said first and second ferroelectric elements.

8. A method as in claim 7 wherein said determining comprises exposing said first ferroelectric element to said infrared source while not so exposing said second ferroelectric element.

9. A method as in claim 7 wherein said ferroelectric elements are ferroelectric capacitors.

10. A method as in claim 7 wherein said sensing circuit comprises an integrator and said utilizing comprises integrating said difference over a plurality of sensing cycles.

11. A method as in claim 7 wherein said determining further comprises reducing the random noise in said sensing circuit by determining said difference over a plurality of measurement cycles.

12. A method as in claim 11 wherein there are 150 or more of said measurement cycles.

* * * * *